5905X
N. & E. P. Crary,
Making Wooden Boxes.
Patented Apr. 6, 1830.
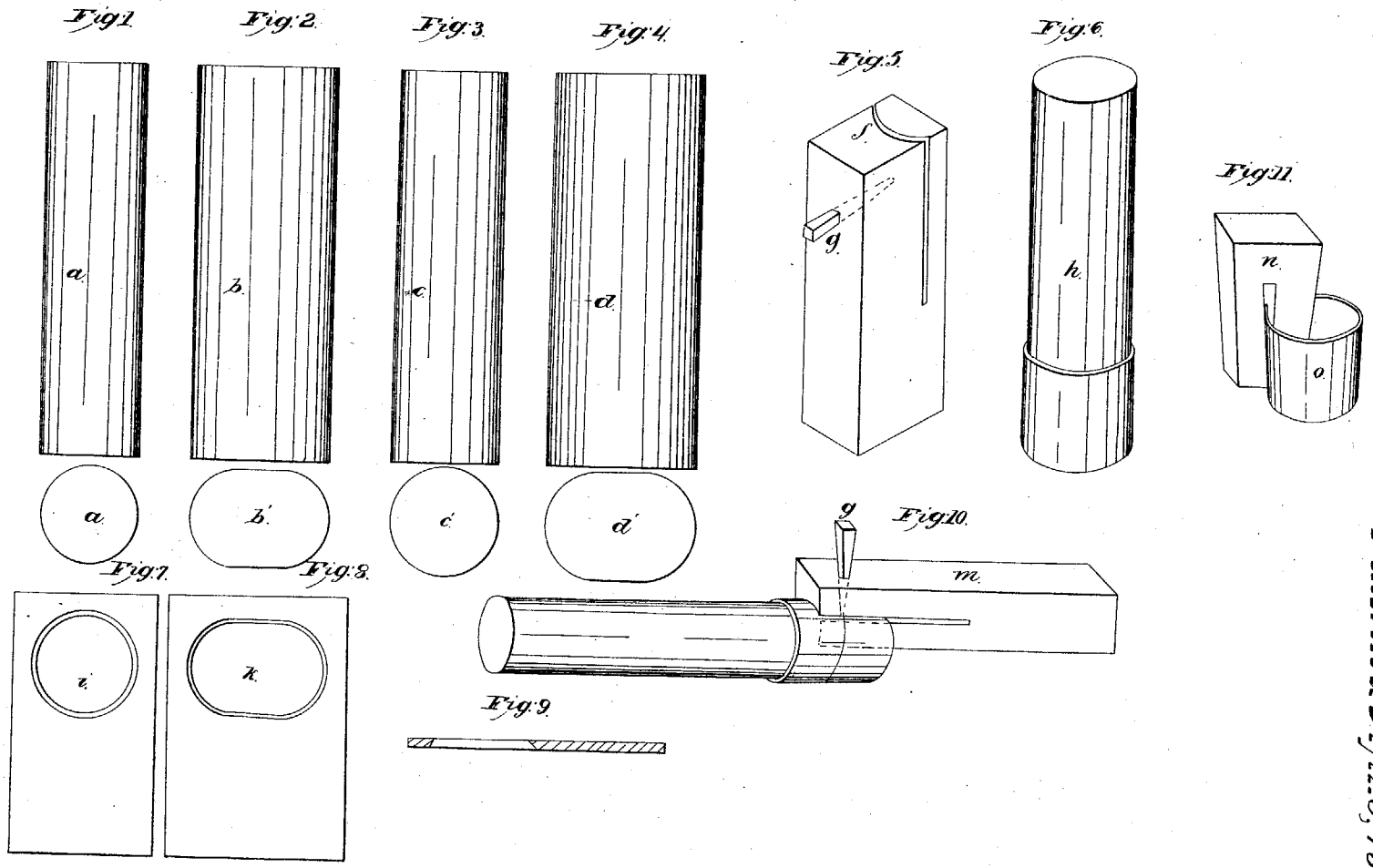
AM. PHOTO-LITHO. CO. N.Y. (OSBORNE'S PROCESS)

X5105 [illegible] 1830 [illegible]

Nathan Crary & Edward P. Crary, Citizens

Letters Patent.

The Schedule referred to in these Letters Patent and making part of the same, containing a description in the words of the said Nathan Crary & Edward P. Crary themselves of their improvement in the mode of making or manufacturing Pill Boxes.

To all Persons to whom these shall come:

Nathan Crary of Knox & Edward P. Crary of the Town of Berne, both of the County of Albany & State of New York, send Greeting. Be it known that we the said Nathan & Edward P. have invented, constructed, made & applied to use a new & useful improvement in the mode of making or manufacturing Pill Boxes or the small circular or oval boxes, commonly known & distinguished by that name to whatever purpose applied, which improvement consists in the construction, application & use of the rollers, the splitting gauge, the steel plate & the gripes, specified in the words following:— The rollers are solid cylinders of wood, of a convenient length, of which rollers one is required for the bodies & one for the covers of boxes of the same size, & which rollers at their circular surface, are respectively of a diameter equal to that of the inner part of the bodies of the boxes & of the bodies of the covers respectively and around which rollers the bodies of the boxes and their covers are respectively wound to be glued or fastened. If the boxes to be manufactured are to be oval instead of round, the rollers have an oval surface instead of the circular one. A number of these rollers is required equal to the number of box bodies & half the number of cover bodies which are in process of gluing or fastening at the same time. The splitting gauge is a piece of wood of convenient size with two flat surfaces at

X5408 at right angles with each other (the most convenient form
for said piece of wood is a parallelopiped) into the angle
formed by which said surfaces an excavation or cutting
is made semicircular at one surface & flat at the other
surface of the said excavation, the last mentioned surfaces
being at right angles with each other, and the semicircular sur-
face of said excavation is of a diameter equal to or a little
greater than that of the bodies of the box covers respectively.
A small pointed steel or spur is thrust thro' said piece of
wood, so as to project up into the circular surface of said
excavation, parallel to the flat surface, & just as far from
it as the intended width of the body of a box cover. The
use of the splitting gauge is to cut a shaving or other suitable
substance for the body of a box cover into two equal parts.
For this purpose the shaving being wound round the roller
as above described, & glued or fastened, the roller with the
shaving around it, at one end of it is placed in the excava-
tion in the splitting gauge & being turned around on its cir-
cular surface, the shaving is cut by the spur into two equal
parts, suitable for the covers of two boxes.— The Steel Plate
is a thin plate of tempered steel of about one eighth of an
inch in thickness, thro' which is made circular holes of a
rather larger circumference at the lower surface than at the
upper one, so that the plate at its upper surface presents a
blunt edge, round the circumference of the holes.— These holes
at their smallest circumference should be precisely equal
to that of which the rollers respectively are required to be
And there should be one hole for the roller for box bodies
and one for those of the bodies of covers for the manufac-
ture of boxes of one size.— If the boxes to be manufactured
are to be oval instead of round, the holes in the plate
must be made of a corresponding shape.— Thro' the holes
in the plate, cylinders of wood or oblong pieces of wood
with

[illegible] we propose to make them of a [illegible]
[illegible] precisely equal size from end to end & then
[illegible] or pieces of [illegible] are then cut up of a suitable
length for rollers.—
The Crimps are blocks of wood or
other proper substance with cuttings or openings in them
of a wedge shape rather larger at the top of the cutting
& smaller at the bottom than the diameter of the box
bodies or the cover bodies respectively & into which
cuttings the box bodies & cover bodies being wound on
round the rollers & glued are respectively pressed or
wedged [illegible].—
In testimony that the above is a true
specification of our said improvement as above describe[d]
we have hereunto set our hands & seals this twenty fifth
day of January in the year of our Lord one thousand &
eight hundred & thirty.

Witnesses
Calvin Pepper Junior
John C. Gallup

Nathan Crary
Edward P. Crary

Cop'd [illegible]
[illegible]

1925